(12) United States Patent
Herlocker et al.

(10) Patent No.: US 10,664,616 B2
(45) Date of Patent: May 26, 2020

(54) ANONYMIZATION OF GEOGRAPHIC ROUTE TRACE DATA

(71) Applicant: Mapbox, Inc., San Francisco, CA (US)

(72) Inventors: Morgan Herlocker, Oakland, CA (US); Laurier Rochon, Montreal (CA); David Michael Thompson, San Francisco, CA (US)

(73) Assignee: Mapbox, Inc., San Francisco, CA (US)

( * ) Notice: Subject to any disclaimer, the term of this patent is extended or adjusted under 35 U.S.C. 154(b) by 194 days.

(21) Appl. No.: 15/925,755

(22) Filed: Mar. 19, 2018

(65) Prior Publication Data

US 2018/0268168 A1    Sep. 20, 2018

Related U.S. Application Data

(60) Provisional application No. 62/473,958, filed on Mar. 20, 2017.

(51) Int. Cl.
| | |
|---|---|
| H04L 29/06 | (2006.01) |
| G06F 21/62 | (2013.01) |
| G06F 16/29 | (2019.01) |
| G01C 21/32 | (2006.01) |
| G01S 5/00 | (2006.01) |
| G01C 21/34 | (2006.01) |
| G01S 19/13 | (2010.01) |
| G01S 19/42 | (2010.01) |

(52) U.S. Cl.
CPC ......... *G06F 21/6254* (2013.01); *G01C 21/32* (2013.01); *G01S 5/0027* (2013.01); *G06F 16/29* (2019.01); *G01C 21/34* (2013.01); *G01S 19/13* (2013.01); *G01S 19/42* (2013.01); *G06F 2221/2111* (2013.01)

(58) Field of Classification Search
CPC ................. G06F 21/6254; G06F 16/29; G06F 2221/2111; G01C 21/32; G01C 21/34; G01S 5/0027; G01S 19/42; G01S 19/13
See application file for complete search history.

(56) References Cited

U.S. PATENT DOCUMENTS

| | | | | |
|---|---|---|---|---|
| 9,794,373 B1 * | 10/2017 | Steinmetz | ............... | H04L 67/42 |
| 2014/0120944 A1 * | 5/2014 | Tarkkala | ............... | H04W 4/027 455/456.1 |

* cited by examiner

*Primary Examiner* — Wasika Nipa
(74) *Attorney, Agent, or Firm* — Fenwick & West LLP (57) ABSTRACT

A trace comprising location data about a computing device is received at a mapping server, where the trace stores the location data about the computing device in an ordered set of points. The origin and destination of the trace are obscured. Then, the trace is then separated into a set of subtraces by dividing the received points of location data into a set of subtraces, and removing the links between subtraces of the set of subtraces. For example, subtraces can be divided based on size, distance, elapsed time, or features of interest present in the location data.

20 Claims, 5 Drawing Sheets

ANONYMIZATION OF GEOGRAPHIC ROUTE TRACE DATA

This application claims priority to provisional patent application No. 62/473,958 filed on Mar. 20, 2017, the contents of which are hereby incorporated by reference.

TECHNICAL FIELD

The technical field of the present disclosure generally relates to improved methods, computer software and/or computer hardware in the field of digital mapping. This disclosure relates more specifically to improved computer-implemented methods for anonymizing location data that is received from computing devices such as personal mobile computing devices and/or onboard computing devices.

BACKGROUND

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

Digitally stored electronic maps are used, for example, to provide directions to users of mobile or onboard computing devices, for example, using any of a wide array of stand-alone map or direction applications, programs, or apps. Today's digital map applications can correctly determine where a client device is (to an accuracy of a few feet or meters) and show in real time where the client device is located on a digital map. Digital map applications also typically include other functionality, such as providing turn-by-turn directions from the client device's current location to nearly any other location. Additional elements such as traffic conditions, accidents, or other notable events may also be displayed on a digital map.

Digital maps also can be found in other applications aside from standalone map applications. For example, ride sharing applications, taxi applications, video games, and many other types of applications may use digital maps. These or other applications can obtain digital maps for display by calling a mapping server through an Application Programming Interface (API). Thus, a single digital map provider that owns or operates the mapping server may supply the digital maps for many different apps with disparate functionality.

In digital map systems, the location of a client device can be determined using WiFi or the Global Positioning System (GPS), which reports a device's location using latitude and longitude, and optionally elevation and time as well. This location data, as well as other data, typically is collected by the digital map provider. In some cases, the collected location data is extremely detailed, recording precise the locations, times, and patterns of movement of the client device.

However, individual end users typically own or control the client devices that provide location data to a digital map provider. For example a user's smartphone can be a client device, and the collected location data from the smartphone can be extrapolated to determine the habits and identity of the end user (for example, determining a home address and a work address of the user). Similarly, location data may be accompanied by metadata directly identifying the associated client device or user. However, end users may not want their locations, routes, or other movement information to be known to the digital map provider, to become public, or to be acquired by a government without their permission. In order to maintain user privacy, it is important to anonymize stored location data such that the location data is not traceable to particular users. However, currently available methods for anonymizing location data may merely remove direct metadata associations between the individual user and the location data. Despite the use of these existing methods, in many cases a user's identity can be accurately inferred through analysis of location data alone. Thus, improved methods for anonymizing location data are needed.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Overview

Computer-implemented techniques are provided for anonymizing location data in digitally stored electronic maps. In some embodiments, location data is telemetry data storing information about the location and movement of a user, user device, or other suitable device or object. For example, telemetry data can represent the physical movement of a device from a first location to a second location. Telemetry data can be obtained or received as digital data from suitable computing devices, such as mobile devices and onboard computing devices, and may comprise a series of data tuples, for example representing location information or metadata, which the computing devices transmit periodically over time.

As used herein, telemetry data representing a trip of a device from an origin location to a destination location is termed a "trace." A trace can comprise an ordered sequence of points, each point associated with a location and one or more adjacent points in the trace, and other suitable telemetry data. For example, a user's trip from home to work can be represented in telemetry data by a single trace. In this example, the first point of the associated trace is associated with the location of the user's home and the last point of the trace associated with the user's work. The path taken from the user's home to the user's work can be represented in a series of intermediate points between the first and last points of the trace and one or more links between adjacent points of the trace. As each trace represents a single trip, many traces for a single device may be collected in a single day and many more over a longer period. For example, over a period of a month, twenty traces may be collected for a user's trips from home to work. Because telemetry data often includes a time stamp, a trace will also in many cases be indicative of what time the user of the device left home and when the user arrived at work.

Even if trace data does not contain information metadata directly identifying a user (for example metadata identifying an associated user account), the amount of information contained in trace data often makes it possible to correlate trace data with an individual user of a computing device that provided the trace data. For example, if it is known where a user works and what time the user usually arrives at work, then evaluating traces over an extended period would likely narrow the possible traces associated with the user's client device to a few or even one. Similarly, if it is known where the user lives and approximately what time the user usually leaves home, traces associated with the user's client device may be obvious. However, trace data can be effectively anonymized by deleting certain portions of the trace data, according to some embodiments. For example, source, origin, and destination data can be removed from traces using random interval values. That is, differently sized sections containing origin and/or destination information may be removed from different traces. Each section can comprise one or more adjacent points of the trace. For example, a section of a first trace representing movement over a distance of a half mile or a travel time of 45 seconds, may be removed from the beginning of the first trace. Similarly, a section representing a quarter mile or 15 seconds of travel time may be removed from the beginning of a second trace. In some implementations, a randomly generated amount of trace data is discarded from the beginning or end of each trace, for example, 5%-20% of the points of a trace. In this way, the origin of the computing device or user is obscured from the trace. A similar method can be user to obscure the destination of the computing device or user.

A trace with the origin and destination of the associated trip obscured (hereinafter, an "obscured trace") may be stored, in some embodiments, for use in creating and updating digital maps. In this context, an obscured trace is a subset of trace data from a trace representing location information or movement somewhere between the origin and destination of a trip without containing location information identifying the origin or destination of the trip. An obscured trace can be further modified in order to better anonymize the trace data. In some embodiments, a trace or obscured trace can be divided into a set of "subtraces," each representing a portion of the original trace. As used herein, a "subtrace" is a section of a trace comprising one or more adjacent points of the original trace. Similar to the original trace, each subtrace can represent the movement of a client device from a first location to a second location, however, as a result of the anonymization process, each particular subtrace does not necessarily correlate to a complete real-world movement or trip of a device. In some embodiments subtraces are of uniform size, however each subtrace can be determined based on any suitable factor, and can be unevenly sized according to some implementations. During the process of dividing a trace into a set of subtraces, connections or associations between subtraces may be removed. For example, information linking a point of a first subtrace with any point of a second subtrace can be removed. Similarly, associations between the subtrace and the original trace or user can also be removed. Therefore, each subtrace is only indicative of a small set of location data and is difficult to associate with a particular user based on the information contained within the individual subtrace.

In some embodiments, metadata identifying the user's computing device is also anonymized. For example, a computing device may include personally identifying metadata with reported telemetry data, such as a device identifier, an advertising identifier, an identifier of an application running on the device, and a vendor identifier with a reported trace. After a trace is received from a computing device, certain identifying device data can be deleted. For example, a device identifier and application identifier may be deleted immediately after trace data is received. Similarly, after trace data is anonymized, the vendor identifier may also be deleted.

Similarly, deleting device metadata may make it more difficult to relate trace data to a specific user. For example, if it is known that a particular user frequently uses a particular application, trace data originating from the particular application is more likely to be associated with the user. Thus, by deleting device metadata, it is more difficult to associate a trace with a user.

After the trace data is anonymized, the resulting anonymized traces and/or subtraces can be aggregated together, further obscuring the source of the trace data. The resulting aggregated telemetry data can then be used by the server to improve the quality of services provided by the server while fully preserving user privacy. For example, trace data or other suitable telemetry data can be received, anonymized, and aggregated at a mapping server providing digital mapping services to a variety of client devices. Based on the aggregated data, the mapping server can, for example, improve the accuracy and quality of the provided digital maps (such as by improving intersection models), provide additional services (such as traffic estimation), or use the aggregated telemetry data for any other suitable purpose while preserving user privacy.

In one embodiment, a data processing method provides an improvement in anonymization of received location data, comprising receiving a trace from a computing device, the first trace comprising location data of the computing device including an origin point, a destination point, and one or more intermediate points. Each point of the trace can comprise latitude, longitude, and time stamp values for the computing device. The mapping server then sections the received trace into a plurality of independent subtraces, which can be then stored separately in digital storage such as a database by the mapping server. Other embodiments, aspects and features will become apparent from the disclosure as a whole.

Example Computer System Implementation

Figure 1:
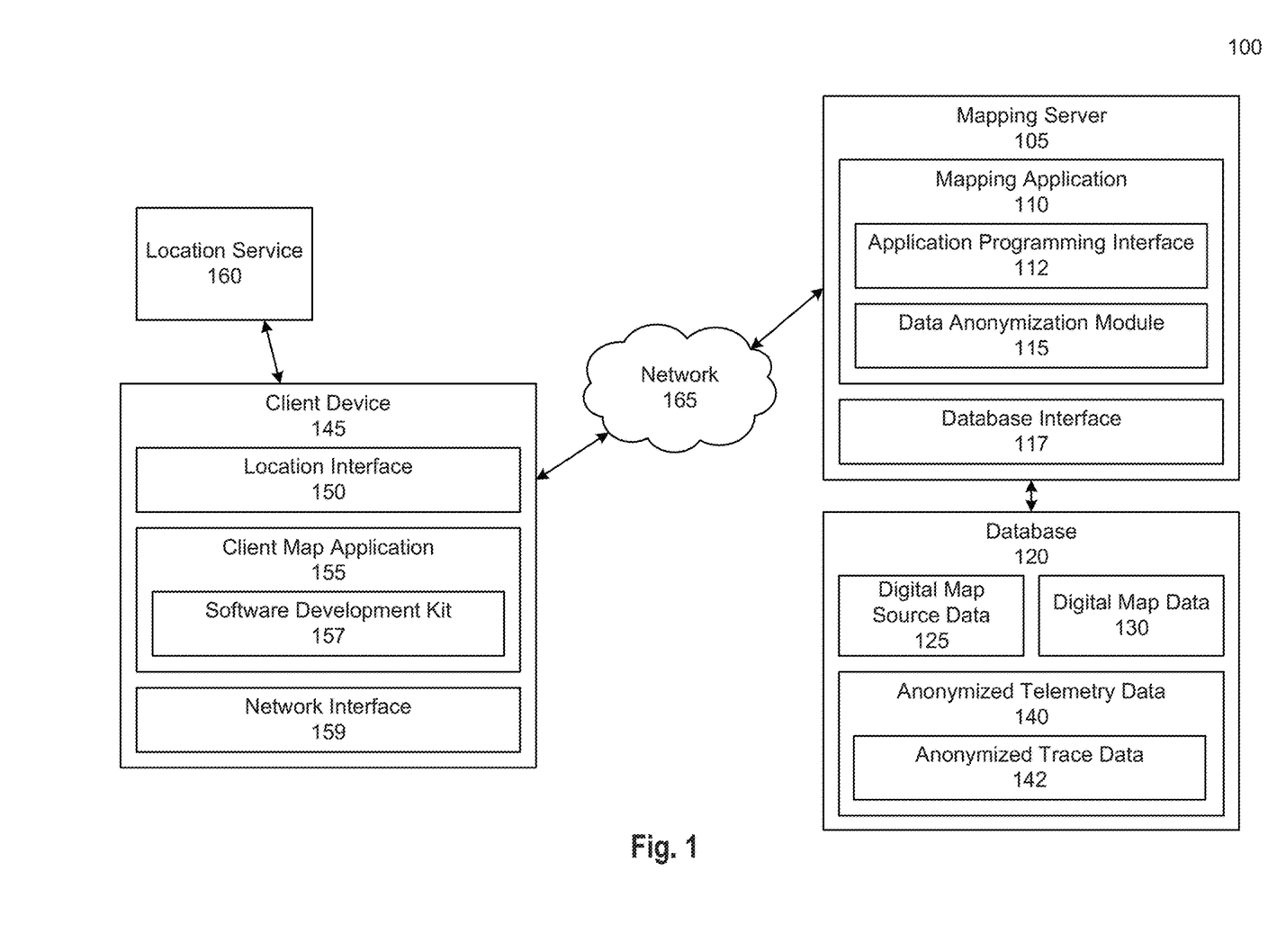
FIG. 1 is a block diagram illustrating an example system environment in which a mapping server and database operates, according to one embodiment.

FIG. 1 is a block diagram illustrating an example system environment in which a mapping server and database operates, according to one embodiment.

In some embodiments, the environment 100 includes components that are implemented at least partially by hardware at one or more computing devices, such as one or more hardware processors executing stored program instructions stored in one or more memories for performing the functions that are described herein. In other words, all functions described herein are intended to indicate operations that are performed using programming in a special-purpose computer or general-purpose computer, in various embodiments. FIG. 1 illustrates only one of many possible arrangements of components configured to execute the programming described herein. Other arrangements may include fewer or different components, and the division of work between the components may vary depending on the arrangement.

FIG. 1 illustrates a client device 145 coupled via a network 165 to a mapping server 105, where the mapping server 105 is coupled to a database 120. A GPS satellite is coupled via a wireless connection to the client device 145. The mapping server 105 comprises a mapping application 110 including an application programming interface (API) 112 and data anonymization module 115 and a database interface 117. The database 120 comprises digital map source data 125, digital map data 130, anonymized telemetry data 140, and anonymized trace data 142. The client device 145 comprises a location interface 150, a client map application 155, a software development kit (SDK) 157, and a network interface 159.

The mapping server 105 may be any computing device, including but not limited to: servers, racks, work stations, personal computers, general purpose computers, laptops, Internet appliances, wireless devices, wired devices, multi-processor systems, mini-computers, and the like. Although FIG. 1 shows a single element, in some embodiments the mapping server 105 comprises one or multiple server computers, such as a server cluster located in one or more physical locations. The mapping server 105 can also represent one or more virtual computing instances executed using one or more computers in a datacenter such as a virtual server farm.

The mapping server 105 is communicatively connected to the database 120 and the client device 145 through any suitable computer network, for example the network 165, using any combination of wired and wireless communication, including, but not limited to: a Local Area Network (LAN), a Wide Area Network (WAN), one or more internetworks such as the public Internet, or a company network. In some embodiments, the mapping server 105 is connected to the client device 145 though the network 165. The mapping server 105 may host or execute mapping application 110, and may include other applications, software, and other executable instructions, such as the database interface 117, to facilitate various aspects of embodiments described herein.

In some embodiments, the database interface 117 is a programmatic interface such as JDBC (Java Database Connectivity) or ODBC (Open Database Connectivity) used to communicate with the database 120. The database interface 117 may communicate with any number of databases using any suitable database format. For example, the database interface 117 can be custom software created by an entity associated with mapping application 110, or can be created by a third party entity in part or in whole.

The database 120, according to some embodiments, is a data storage subsystem consisting of programs and data that is stored on any suitable storage device such as one or more hard disk drives, memories, or any other digital data recording device configured to store data. Although the database 120 is depicted as a single device in FIG. 1, the database 120 may span multiple devices located in one or more physical locations. For example, the database 120 may include one or more nodes located at one or more data warehouses. Additionally, in some embodiments, the database 120 is located on the same device or devices as the mapping server 105. In other embodiments, the database 120 is located on a separate device or devices from the mapping server 105.

The database 120 may be a relational database, a noSQL database, or use any other suitable database or file storage format. The database 120 can be communicatively connected with the mapping server 105 through any suitable computer network using any combination of wired and wireless communication as previously described. Optionally, the database 120 may be communicatively connected with other components, either directly or indirectly, such as one or more third party data suppliers. Generally, the database 120 stores data related to digital maps including, but not limited to: digital map source data 125, digital map data 130, and anonymized telemetry data 140, which includes anonymized trace data 142. For example, these datasets may be stored as columnar data in a relational database, as flat files, in structured text files, or by any other suitable data storage method. In some implementations, type of data stored in the database 120 can be stored separately, spread across multiple databases 120, or stored by any other suitable method.

In one embodiment, digital map source data 125 is raw digital map data that is obtained, downloaded or received from a variety of sources. Raw digital map data may include satellite images, digital street data, building or place data, terrain data, or any other suitable type of map data. For example, digital map data can be sourced from the National Aeronautics and Space Administration (NASA), from the United States Geological Survey (USGS), and/or from DigitalGlobe. Digital map source data 125 can be updated at any suitable interval, and may be stored for any amount of time. Once obtained or received, digital map source data 125 is used to generate digital map data 130, according to some embodiments.

In one embodiment, digital map data 130 is digital map data that is provided, either directly or indirectly, to client map applications, such as the client map application 155, by the mapping application 110, for example using the API 112. In some implementations, digital map data 130 is based on digital map source data 125. Specifically, digital map source data 125 can be processed and organized as a plurality of vector tiles which may be subject to style data to impose different display styles to generate digital map data 130. The digital map data 130 may be updated at any suitable interval, and may include additional information beyond that derived from digital map source data 125. In some embodiments, anonymized telemetry data 140 is used to augment the digital map source data 125 when generating digital map data 130. Further, additional information relevant to generating or updating digital maps can be stored in tiles, for example traffic patterns, turn restrictions, detours, common or popular routes, speed limits, new streets, and any other information related to digital maps or the use of digital maps can be stored in tiles (or another suitable format). The anonymized telemetry data 140 (and other relevant information) can then be used to generate relevant additional information (for example, a traffic density map based on a large number of aggregated subtraces), or to otherwise improve the quality of the digital map data 130.

In some embodiments, anonymized telemetry data 140 is telemetry data that has been anonymized and filtered to allow the anonymized telemetry data 140 to be stored and used while maintaining user privacy. Anonymization may include removing any data that identifies a specific client device, user, or other person associated with the received telemetry data. For example, anonymization may include dividing a continuous set of related telemetry data into independent sections to remove the ability to infer information about an associated user or device by viewing the full continuous set of telemetry data. For example, a trace can be divided into multiple subtraces, each representing a portion of a device's travel along a route. The anonymization process can also remove or obscure trip origin and destination points or otherwise anonymize telemetry data in any suitable manner. Filtering may remove inconsistent or irregular data, delete traces, trips, or subtraces that lack sufficient data points (such as a trace or subtrace containing only one data point), or exclude any type or part of data for any reason. For example, traces or subtraces can be filtered to remove outlier data generated by inaccuracies in the associated location data. In some implementations, anonymized telemetry data 140 can be used to generate useful digital map data 130, for example by aggregating anonymized telemetry data 140 together from multiple sources. In some implementations, anonymized telemetry data 140 can be a set of one or more subtraces, each generated from one of a plurality of traces related to digital map data 130. As a result of the anonymization process, anonymized telemetry data 140 may be stored for any amount of time, such as a day, a week, or indefinitely without compromising the privacy of users or client devices. In some implementations, stored anonymized telemetry data 140 is further processed or used by various applications or functions. For example, anonymized telemetry data 140 can be used to improve the quality of digital maps provided by the mapping server 105.

In some embodiments, anonymized trace data 142 includes trace data which has been anonymized to remove associations between the telemetry data and the associated device which captured the telemetry data. For example, anonymized trace data can comprise a set of subtraces which, as described above, represent the movement of a client device 145 from a first point to a second point. However, as a result of the anonymization process, a particular subtrace does not necessarily correlate to a complete real-world movement of the associated device. Anonymized trace data 142 may be stored as or associated with one or more subtraces related to digital map data 130, and may be stored for any amount of time. In some implementations, the anonymized trace data 142 is organized and stored in a tree structure, such as a quadtree. For example, a quadtree is a tree data structure that is used to index multidimensional data such as geographical coordinates. For example, once organized into an R-tree, the anonymized trace data 142 may be searched to identify one or more subtraces relevant to a query or calculation.

The client device 145 can be any mobile computing device, such as a laptop computer, hand-held computer, wearable computer, cellular or mobile phone, portable digital assistant (PDA), tablet computer, onboard navigation device, or any other suitable device capable of running a client map application 155 or transmitting telemetry data to the mapping server 105.

In some embodiments, each client device 145 is communicatively connected to mapping server 105 through the network 165, which may comprise any combination of a LAN, a WAN, one or more internetworks such as the public Internet, a cellular network, a company network, or any other suitable communication network. Although a single client device is depicted in FIG. 1, any number of client devices may be present in the environment 100. In some embodiments, the client device 145 is communicatively coupled to a location service 160 through the location interface 150. The location service 160 is a server or other computing device which can provide information about the location of the client device 145. For example, the location service 160 can be a GPS satellite, system of GPS satellites, or any other suitable technology for determining the position of the client device 145. The location interface 150 can determine or approximate the location of the client device 145 based on information received from the location service 160. In some embodiments, the location interface 150 comprises a GPS transceiver used to receive signals from a plurality of GPS satellites (in this case represented by the location service 160) transmitting signals for resolution into a latitude-longitude position by the location interface 150 via triangulation calculations. In other embodiments, the location interface 150 determines or receives location information about the client device 145 through any other suitable method.

The client map application 155, according to some embodiments, enables the client device 145 to collect and send telemetry data about the client device 145 to the mapping server 105. In some implementations, the client map application 155 also utilizes digital map data 130 provided by the mapping server 105 to provide location based information to a user of the client map application 155. In some implementations, the client map application 155 uses the SDK 157 to access digital map data or transmit telemetry data through the API 112 of the mapping application 110. In some implementations, captured telemetry data includes device location information, for example location data based on GPS signals. Captured telemetry data may comprise one or more digitally stored telemetry events or "points," in which each event comprises a plurality of event attribute values. Telemetry events stored as telemetry data may include information about the use of the client map application 155, such as session start, map load, map pan, map zoom, map tilt, and map rotate events, and device location information, such as a location report, a speed and heading report, or a visit event including dwell time plus location. Telemetry event attributes may include latitude-longitude (latlong) coordinates for the then-current position of the device, a session identifier, instance identifier, application identifier, device data about the client device 145, connectivity data, view data, and a timestamp. For example, a point can be a set of coordinates representing a specific location (stored as latlong coordinates or any other suitable representation) alongside a timestamp. In some implementations captured telemetry data is organized into one or more traces, with each trace describing a trip of the client device 145 from an origin location to a destination location. A particular trace may contain two or more telemetry data points, depending on the length of the trace and how frequently telemetry data is collected at the client device 145. After capturing telemetry data, the captured telemetry data can then be transmitted to the mapping server 105 over the network 165 for processing and/or analysis. Telemetry data can be transmitted from the client device 145 to the mapping server 105 in real time, periodically, manually based on user instruction, or based on any other suitable criteria.

The client device 145 may also include a network interface 159 used by the client device 145 to communicate or interface with other devices or servers over the network 165. In some embodiments, the network interface 159 enables the client device 145 to send telemetry data to the mapping server 105 over the network 165. The network interface 159 may use WiFi, WiMAX, Bluetooth, ZigBee, cellular 4G, Ethernet, or any other suitable communication technology to connect the client device 145 to other devices or servers.

The client device 145 may also include other hardware elements, such as memory, processors, and the like, not depicted in FIG. 1. For example, the client device 145 can include applications, software, and other executable instructions to facilitate various aspects of embodiments described herein. These applications, software, and other executable instructions may be installed by a user, owner, manufacturer, or other entity related to the client device 145.

In the mapping server 105, the mapping application 110 provides an API 112 that may be accessed, for example, by the client map application 155 using the SDK 157, to provide digital mapping functionality to the client map application 155. Specifically, the mapping application 110 comprises program instructions that are programmed or configured to perform a variety of backend functions needed to provide digital mapping functionality including, but not limited to: sending digital map data to client devices 145, receiving telemetry data (in some embodiments including trace data) from client devices 145, processing received telemetry data to generate anonymized telemetry data 140 such as anonymized trace data 142, receiving digital map source data 125 from data providers, processing digital map source data 125 to generate digital map data 130, and any other aspects of embodiments described herein. In some implementations, the mapping application 110 includes a data anonymization module 115 which is programmed or configured to anonymize received telemetry data.

Telemetry data may be received from any suitable client device 145, such as a user's smartphone, specialized location tracker, a vehicle's onboard computing device, a dongle that plugs into a vehicle's computer system, or another suitable client device 145. For example, telemetry data can be received from a client device 145 via a function calls that are included in a SDK 157 embedded in a client map application 155. Received telemetry data may be only transiently stored at the mapping server 105 or database 120, and can be processed as discussed below before permanent storage as anonymized telemetry data 140.

In one embodiment, the data anonymization module 115 comprises data anonymization instructions programmed or configured to delete or modify data received at the mapping server 105 from the client device 145. The data anonymization module 115 may delete or modify beginning, ending, or intermediate portions of received telemetry data to remove sections of the telemetry data that could be used to identify the user or client device 145 associated with the received telemetry data. In some embodiments, the amount of telemetry data that is deleted or modified to anonymize received telemetry data (for example a received trace) is determined randomly via a randomization process. The randomization process may utilize amount ranges, according to some embodiments. For example, the amount of data deleted from the beginning of a received trace with points comprising latitude, longitude, and time stamp values may be randomized to remove points within a range of 0-0.5 miles of the origin of the trace or within 0-1 minutes of the start timestamp of the trace.

In some embodiments, the data anonymization module 115 is programmed or configured to divide telemetry data (such as traces) received at the mapping server 105 from the client device 145 into subtraces or other sections of data. As described above, a subtrace is a separated subsection of a trace, for example comprising a subset of the points of telemetry data from the original trace. Dividing a trace into subtraces can be performed after sections of the trace or other telemetry have been deleted or modified, for example after identifying metadata is removed and the origin and destination of the trace are obscured as described above. Subtrace division can be based on division points set throughout a trace. Subtrace divisions can be set randomly, based on a repeating pattern or at predetermined intervals, or based on identified features or patterns in the telemetry data. For example, certain points of telemetry data or groups of points of telemetry data can represent a variety of features of interest performed by a user and captured in the trace. Features of interest can include maneuvers such as stops, turns, or other dramatic changes of direction or speed captured in a trace. In some embodiments, subtrace divisions are set such that each subtrace (or as many subtraces as practical) include at least one maneuver or other feature of interest. In some implementations the data anonymization module 115 deletes any remaining connections between subtraces after the subtrace divisions are set such that each individual subtrace can be stored independently. In some implementations, each subtrace can be individually obscured by removing, as described above, randomly sized origin and destination segments from each subtrace. Further obscuring subtraces can prevent the original trace from being recreated by combining a set of connecting subtraces (for example, based on matching timestamp data and location between the origin of one subtrace and the destination of another subtrace).

Example Data Anonymization

Figure 2A:
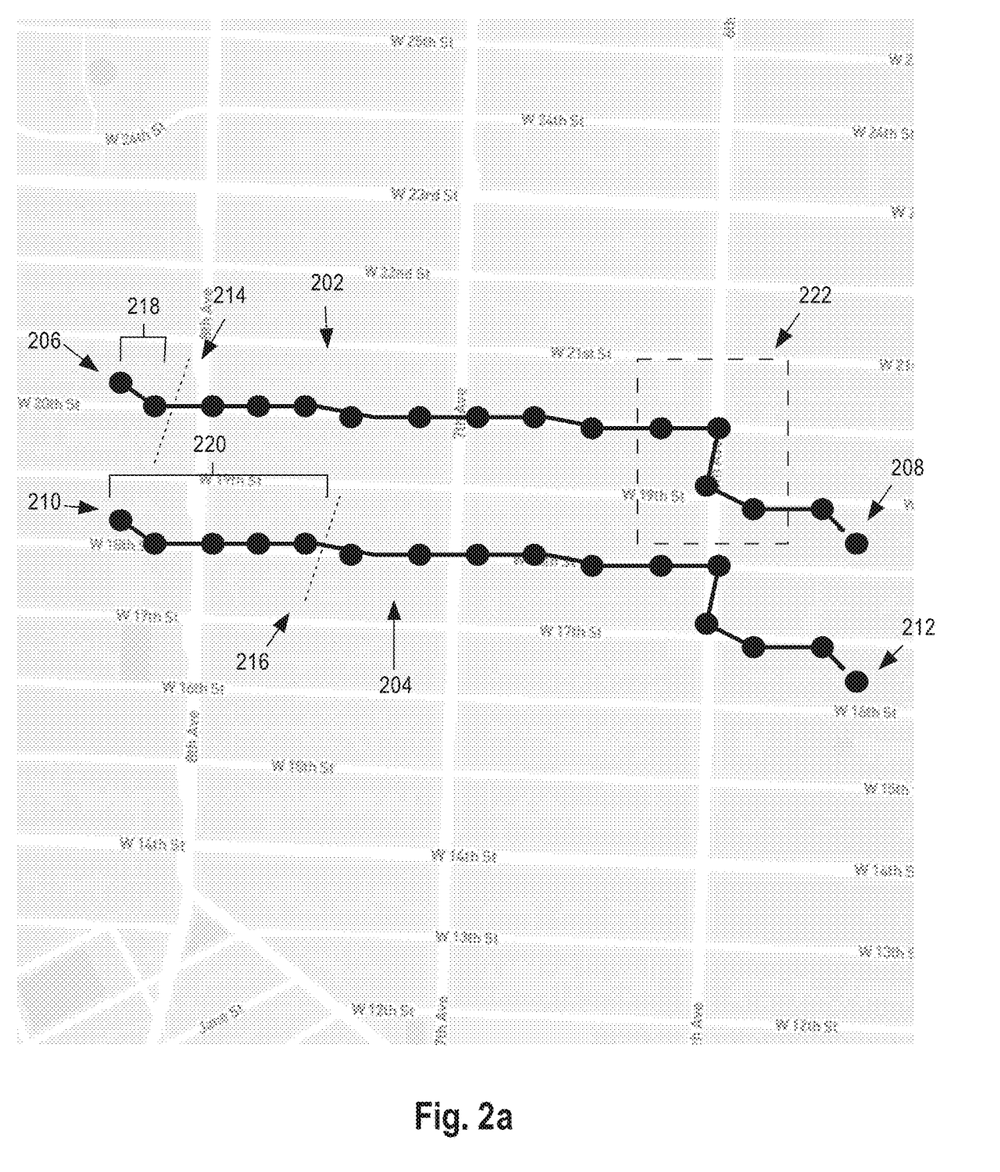
FIG. 2A illustrates example location trace data, according to one embodiment.
Figure 2B:
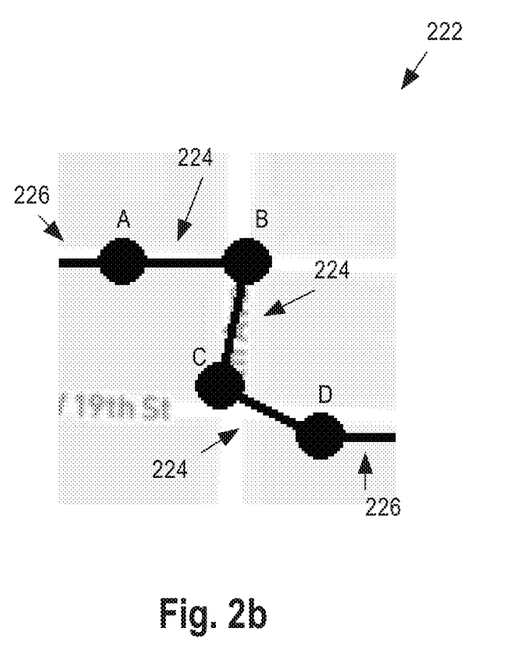
FIG. 2B illustrates example anonymized location trace data, according to one embodiment.

FIG. 2A and FIG. 2B illustrate an example of data anonymization in accordance with an embodiment.

In the embodiment of FIG. 2A, a first trace 202 and a second trace 204 are shown on a digital map. FIG. 2A shows hypothetical data and maps and is provided merely to illustrate one clear example; other embodiments may use other forms of data or maps to perform equivalent functions in relation to different data.

The first trace 202 and second trace 204 may each comprise telemetry data representing the movement patterns of a device for a trip. The device associated with the first trace 202 and the device associated with the second trace 204 may be two different devices or a single device on two separate occasions. For example, the first trace 202 may comprise trace data collected from a first client device belonging to a first user and the second trace 204 may comprise trace data collected from a second client device of a second user. Alternatively, the first trace 202 may comprise trace data collected from the first client device on a first day and the second trace 202 may comprise trace data collected from the first client device on a second day.

In the embodiment of FIG. 2A, each of the first trace 202 and the second trace 204 is comprised of a plurality of points of telemetry data and connections between the points of telemetry data. The first trace 202 comprises a first origin point 206 and a first destination point 208 connected by a plurality of intermediate points. The first origin point 206 and the first destination point 208 represent the starting and ending locations, respectively, for a trip associated with the trace. As described above, each trip may represent the motion and/or location of a client device over a period of time. For example, when a user carrying a client device travels from home to work, the first origin point 206 can be situated approximately at the user's home. Similarly, the second trace 204 comprises a second origin point 210, a second destination point 212, and multiple intermediate points.

As described above, trace data can be used to determine personal information about the associated user, for example the locations of the user's home, workplace, and other significant locations visited by the user. Further, a user's patterns of movements could also potentially be determined from a plurality of traces, for example by associating traces associated with the same client device, or associating traces sharing the same origin or destination point. For example, the client device associated with the first trace 202 could be associated with a user living at the address associated with the first origin point 206 based at least in part on the first trace 202. Therefore, in some embodiments, certain sections of received traces may be removed to obfuscate the original origin 206 and destination 208 points of a trace or other relevant sections of the trace. For example, in FIG. 2A, a first cutoff 214 is indicated for the first trace 202. The first cutoff 214 divides the first origin section 218 containing the first origin point 206 from the remainder of the trace 202. That is, the first origin cutoff 214 divides the points of telemetry data associated with the first trace 202 into two sections, the first origin section 218 and a section comprising the remaining points associated with the trace. In the embodiment of FIG. 2A, the first origin section 218 includes multiple points (including the first origin point 206) and connections between points. In some implementations, the section containing the origin point 206 (in this case the first origin section 218) is discarded, thereby obscuring the original origin point of the trace. In this way, it can be more difficult to determine personal user information such as a user's home using trace data including the first trace 206 or the second trace 204. This process can be repeated to generate a first destination cutoff, then determine and discard a destination section including the first destination point 208 to obscure the original destination of the first trace 202.

Similarly, origin and destination of the second trace 204 can be similarly obscured. In the embodiment of FIG. 2A, the second trace 204 includes a second origin cutoff 216 separating a second origin section 220 from the rest of the second trace 204. To obscure the origin of the second trace 204, the second origin section, including the second origin point 210 and a set of intermediate points, can be removed. As with the first trace 202, the destination of the second trace 204 can also be obscured.

In some embodiments, sections are measured based on the number of points associated with the section. Each section can be considered to have a "size," which may be indicative of distance traveled in the section, elapsed time associated with points in the section, number of points in the section, or another appropriate measurement. For example, a section can be measured by how much time passed between the first and last points of the section or by the travel distance along the trace between the first and last points in the section.

As shown in FIG. 2A, the removed sections (for example the first and second origin sections 218 and 220) may have varying sizes. That is, in an embodiment, the first origin section 218 consisting of two points is removed from the first trace 202 and the second origin section 220 consisting of (for example) five points is removed from the second trace 204. In some embodiments, the size of an origin or destination section may be determined randomly via a randomization process, which may use a random or pseudo-random calculation or algorithm for selection. "Random," "randomly sized" and "randomization", as used herein, refer broadly to truly random or pseudo-random techniques. The randomization process may rely on a range of values that may be set based on the overall size of the trace. For example, the randomization process may randomly calculate or choose a number of points between 3 and 20, a distance between 150 and 1,000 feet, or an elapsed time between 30 and 300 seconds to generate origin and destination sections. In some implementations, a minimum size of an origin or destination section can be set to ensure that the generated section sufficiently obscures the origin or destination of the trace. In some embodiments, randomization ranges are based on the size of the trace, for example, increasing for larger traces and decreasing for smaller traces. For example, the size of a randomization range or section can scale based on a percentage of the overall/current size of the trace.

In some implementations, a randomly-sized section is removed from the beginning of each trace. Additionally or alternatively, a randomly-sized section is also removed from the ending of each trace. In this way, the origin and destination for each trace can be effectively obscured. In some implementations, anonymization ends after the generation of the obscured trace. However, in other embodiments the obscured trace can be further anonymized, as personal information about a user can potentially still be determined from an obscured trace, such as the general location of the user's home, general movement patterns of the user, or other personal information about the user.

Therefore, after the origin and destination of a trace has been obscured, for example by determining and discarding origin and destination sections for the trace, an obscured trace can be divided to form one or more subtraces for storage and retrieval by the mapping server 105. As described above, a subtrace is an independent subsection of a trace, for example the trace 202. An example subtrace 222 is shown in FIG. 2A. The subtrace 222 is a section of the trace 202 including one or more points associated with the trace 202. In the embodiment of FIG. 2A, the origin and destination sections of the trace 202 have been removed to obscure the trace 202, and the remaining intermediate points of the trace 202 can be divided into a set of subtraces, including the subtrace 222. In some implementations, subtraces are stored independently of the associated trace and other subtraces generated from the same trace, allowing trace data (in the form of subtraces) to be stored and analyzed by the mapping server without compromising user privacy or personal information. In some implementations, the origin and destination of each subtrace is obscured using similar methods as described above.

A trace can be divided into subtraces randomly, semi-randomly, or based on any suitable criteria or combination of criteria, for example, based on measurements of distance, time, or number of points. For example, a trace may be divided into subsets that represent no more than five minutes or five miles of travel. In some embodiments, divisions between subtraces are determined at least in part based on features of interest. For example, a trace may be divided into subtraces such that each subtrace includes at least one feature of interest.

As used herein, a "feature of interest" can be any action or maneuver recorded by a series of points of telemetry data, which can provide useful information to the mapping application 110. Features of interest include turning, speeding up, slowing down, stopping, starting, changing lanes, and so on. In some implementations, features of interest are used by the mapping application 110 to increase the quality of the digital maps provided to the client devices 145, for example by improving turn by turn instructions. For example, in FIG. 2B, points A-C of the subtrace 222 are indicative of a right turn feature of interest. This information can be useful in determining that right turns are allowed at that intersection, how fast users typically travel when making the turn, how often turns are made at the intersection, and so on.

FIG. 2B illustrates an example subtrace 222. For clarity, the example subtrace 222 includes four points, denoted herein as points A, B, C, and D. In other embodiments, subtraces may include any suitable number of points or amount of telemetry data. For example, each subtrace can include between 50 and 300 points. The subtrace 222 also includes several connectors linking the points of the subtrace 222 with other points of the trace 202, which will be referred to herein as "intra-connectors" 224 and "inter-connectors" 226. Intra-connectors 224 represent links between points within the subtrace 222. For example, an intra-connector 224 connects point A to point B, another intra-connector 224 connects point B to point C, and a third intra-connector 224 connects point C to point D. In contrast, inter-connectors 226 connect points within the subtrace 222 to points outside the subtrace 222 (for example, points in other subtraces generated from the trace 202). For example, points A and D each have inter-connectors connecting them to points outside the subtrace 222.

Intra-connectors 224 and inter-connectors 226 between two points indicate at least that the two points are both members of the same trace and each of the two points either immediately precedes or follows the other. For example, the intra-connector 224 between points A and B indicates both that the points A and B are members of the same first trace 202 and that point B immediately follows or precedes point A. Analysis of time stamps associated with points A and B may further indicate that point B immediately follows point A and that points A and B are connected.

After the remaining intermediate points of the trace 202 are divided into a plurality of subtraces, including the subtrace 222, connections linking different subtraces together can be removed. For example, the inter-connectors 226 may be removed to disassociate the subtrace 222 with other subtraces generated from the same trace 202. Once the links between the subtrace 222 and neighboring subtraces are removed, the subtrace 222 provides no indication of which point precedes point A and which point follows point D. That is, each subtrace, including the subtrace 222, is independent of other subtraces generated from trace 202 and does not contain any information linking the subtrace 222 with any other subtraces based on the trace 202. Therefore, multiple subtraces cannot be grouped together to recreate the original trace 202. Further, because the subtrace 222 contains information on only a small subsection of a trip (which may be interchangeable with many other trips following a similar route along that subsection) the information contained in the subtrace 222 is difficult to trace to the client device 145 and associated user that provided the original trace 202.

In some embodiments, individual subtraces are further anonymized by removing randomized sections of the subtrace. For example, a random-sized origin section that includes point A may be removed from the beginning of subtrace 222 and a random-sized destination section that includes point D may be removed from the end of subtrace 222. The size of the removed sections may be randomly or semi-randomly selected, predetermined, or selected based on any suitable criteria and may vary between subtraces. The generated subtraces can then be stored as anonymized trace data 142 in the database 120.

In some implementations, the mapping server 105 or another system used for creating or updating digital maps may access only subtraces and may not access non anonymized trace data as provided by client devices 145 when creating or updating digital maps. That is, that mapping server 105 may only access subtraces or similarly anonymized data for small portions of traces that do not include origin, destination, connections to other subtraces, or certain device data. In this way, the data used in developing digital maps is not traceable to individual users, according to some embodiments.

Example Functional Implementation

Figure 3:
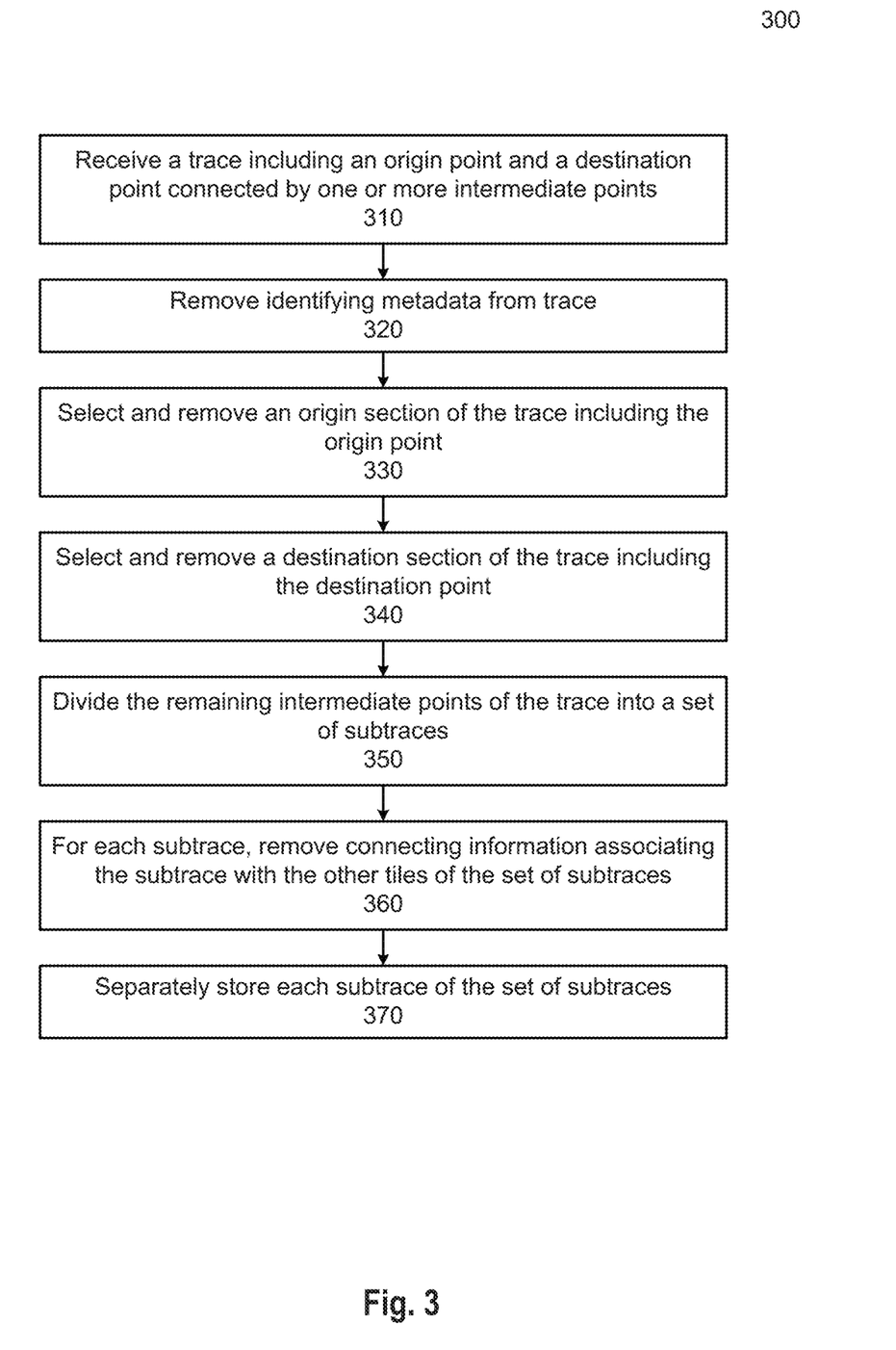
FIG. 3 is a flowchart illustrating an example method for anonymizing location trace data.

FIG. 3 is a flowchart illustrating an example method for anonymizing location trace data. Although the steps in FIG. 3 are shown in an order, the steps of FIG. 3 may be performed in any order, and are not limited to the order shown in the process 300. Additionally, some steps of the process 300 may be optional, may be performed multiple times, and/or may be performed by different components. All steps, operations and functions of a flow diagram that are described herein are intended to indicate operations that are performed using programming in a special-purpose computer or general-purpose computer, in various embodiments, at the same level of detail that is used by persons of ordinary skill in the art to which the disclosure pertains for communicating with one another about similar computer programs or algorithms. In other words, each flow diagram in this disclosure is a guide, plan or specification of an algorithm for programming a computer to execute the functions that are described.

The process 300 begins when the mapping server receives 310 a trace from a client device. For example, the received trace can include an origin and destination point linked by one or more intermediate points. In some embodiments, the client device transmits the entire trace at one time, however the trace may be received over a period of time or in real time as the trace data is collected by the client device. Additional traces of differing sizes may also be received from the same client device or another suitable client device. Each received trace can comprise metadata and location data associated with the position of the client device. For example, metadata received with a trace may include a device identifier, an application identifier (identifying the application run on the client device that provides the data set), and a vendor identifier. The location data associated with a received trace can comprise a set of multiple points, including an origin point, a destination point, and one or more intermediate points. As described above, each point may comprise latitude, longitude, and time stamp values and can be associated or connected to one or more other points in the trace. In some implementations, the origin and destination points of a received trace are associated with origin and destination of a complete trip made by the client device. However, in other embodiments a trip can be represented by multiple traces, each trace having a separate origin and destination point.

Then, the mapping server removes 320 any identifying metadata from the received trace. For example, the mapping server can remove metadata linking the received trace to the client device, for example by removing a device identifier of the client device from the trace. Next, an origin section of the trace including the origin point can be selected and removed 330 from the beginning of the trace. As described above, this process may include randomly or semi-randomly generating the size of the origin section. Similarly, the mapping server then selects and removes 340 a destination section of the trace including the destination point. As with the origin section, the size of the destination section can be randomly or semi-randomly generated. In some embodiments, any other suitable beginning or end section of a trace can be removed.

In some implementations, the remaining intermediate points of the received trace are then divided 350 into subtraces. For example, subtraces can be generated based on a preset or random size value, based on geographic location, or based on features of interest in the trace. In some implementations, individual subtraces can be further anonymized, for example by removing origin and destination sections from each of the subtraces. During the subtrace division process, connecting information linking the generated subtraces can be removed 360. For example any association between subtraces, such as an interconnector linking points in different subtraces, can be removed such that each subtrace may be independently stored without reference to other subtraces.

In some embodiments, the process 300 additionally involves anonymizing one or more additional traces received from the same client device or any number of other suitable client devices as described in steps 310-370 of the process 300. For example, the additional received traces can have origin and destination sections removed and be similarly divided into subtraces, as described above. Further, the size of the removed sections of the one or more additional traces may be based on additional randomly generated size values. Therefore, sections removed from each anonymized trace may have different randomly generated sizes. As described above, the size of a section may be measured by geographical area or distance, elapsed time, number of points, or any other suitable measurement.

Then, the set of subtraces can be stored 370 independent from each other, for example in a database connected to the mapping server. Similarly, sets of subtraces generated by anonymizing a plurality of other received traces can be similarly stored in the database or other suitable computer storage.

Using this process, the anonymization of received telemetry data and the efficiency of data storage and processing for a digital map system can be greatly improved. Specifically, information identifying the origins and destinations of a user's trips may be removed or modified from received telemetry data to hide a user's location, home, workplace, or other point of interest from other users or from entities with access to the stored telemetry data. The origins, destinations, and paths of travel of a user can be further obscured through dividing the trace data into a plurality of subtraces. Therefore, it is difficult to associate a subtrace with a user and/or determine the movement patterns of an individual user from a subtrace. The anonymization process can maintain user privacy while also providing useful information for creating and updating digital maps. For example, subtrace data and other anonymized telemetry data can be used to estimate traffic conditions, improve the accuracy of intersection information within digital maps, an otherwise improve the quality of provided digital maps. The techniques herein also can result in storing less data, using less memory and reducing the number of CPU cycles to process the anonymized data once unnecessary identifying data has been removed, because the resulting datasets usually are smaller.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and program logic to implement the techniques.

Figure 4:
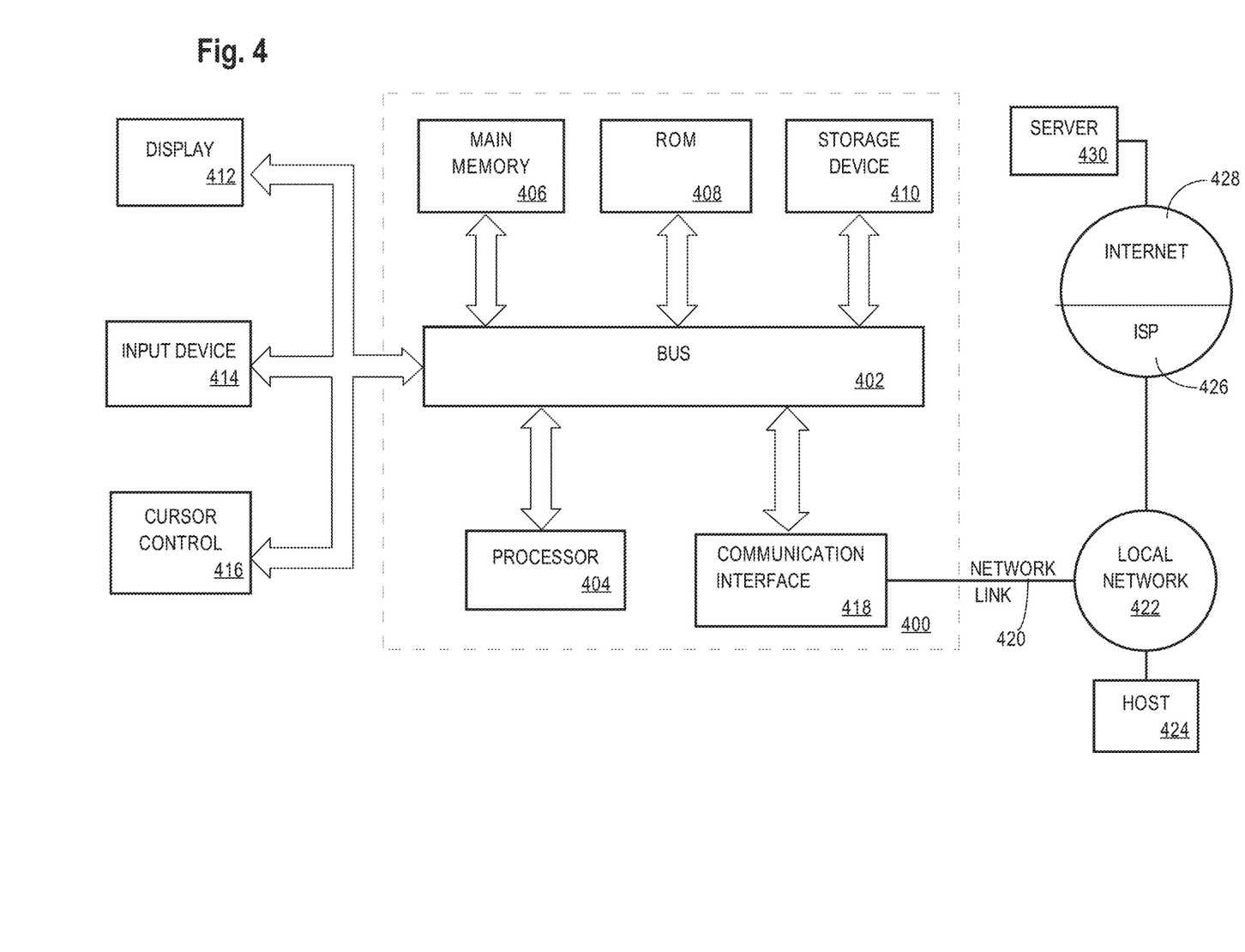
FIG. 4 is a block diagram illustrating an example computer system upon which an embodiment may be implemented.

For example, FIG. 4 is a block diagram that illustrates a computer system 400 upon which an embodiment of the invention may be implemented. Computer system 400 includes a bus 402 or other communication mechanism for communicating information, and a hardware processor 404 coupled with bus 402 for processing information. Hardware processor 404 may be, for example, a general purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a LCD screen, LED screen, or touch screen, for displaying information to a computer user. An input device 414, which may include alphanumeric and other keys, buttons, a mouse, a touchscreen, or other input elements is coupled to bus 402 for communicating information and command selections to processor 404. In some embodiments, the computer system 400 may also include a cursor control 416, such as a mouse, a trackball, or cursor direction keys for communicating direction information and command selections to processor 404 and for controlling cursor movement on display 412. The cursor control 416 typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and instructions that cause a machine to operation in a specific fashion. Such storage media may comprise non-volatile media and volatile media. Non-volatile media includes, for example, optical or magnetic disks, such as storage device 410. Volatile media includes dynamic memory, such as main memory 406. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic, radio, or light waves, such as those generated during radio-wave and infra-red data communications, such as WI-FI, 3G, 4G, BLUETOOTH, or wireless communications following any other wireless networking standard.

Various forms of media may be involved in carrying one or more sequences of one or more instructions to processor 404 for execution. For example, the instructions may initially be carried on a magnetic disk or solid state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418. The received code may be executed by processor 404 as it is received, and stored in storage device 410, or other non-volatile storage for later execution.

Extensions an Alternatives

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
   receiving, at a mapping server from a client device, a first trace comprising a set of location data, the location data comprising an origin point, a plurality of intermediate points, and a destination point in an ordered sequence, wherein the first trace comprises identifying information associated with the client device; and
   anonymizing the first trace by:
     selecting, at the mapping server, an origin section for the first trace, the origin section comprising the origin point and one or more intermediate points;
     removing the origin section from the first trace;
     selecting, at the mapping server, a destination section for the first trace, the destination section comprising the destination point and one or more intermediate points;
     removing the destination section from the first trace; and
     dividing, at the mapping server, the first trace into a plurality of subtraces, each subtrace comprising a plurality of consecutive intermediate points of the location data.

2. The method of claim 1, wherein anonymizing the first trace further comprises:
   removing, from each subtrace, location data connecting the subtrace to any other subtraces of the set of subtraces; and
   storing, by the mapping server, each subtrace independently of each other subtrace in the set of subtraces.

3. The method of claim 1, wherein removing, from each subtrace, location data connecting the subtrace to any other subtraces of the set of subtraces further comprises:
   selecting, at the mapping server, an origin section for a first subtrace of the set of subtraces;
   removing the origin section from the first subtrace;
   selecting, at the mapping server, a destination section for the first subtrace; and
   removing the destination section from the first subtrace.

4. The method of claim 1, wherein dividing the first trace into a set of subtraces comprises randomly selecting a size for each subtrace of the set of subtraces.

5. The method of claim 4, wherein the size of a subtrace is determined based on a measure of the time or distance associated with the subtrace.

6. The method of claim 1, wherein anonymizing the first trace further comprises:
   determining one or more features of interest in the first trace, each feature of interest associated with one or more intermediate points of the first trace;
   and wherein dividing the first trace into a set of subtraces is based on the one or more features of interest.

7. The method of claim 1, wherein each subtrace of the set of subtraces includes one or more intermediate points associated with a feature of interest.

8. The method of claim 1, wherein each subtrace of the set of subtraces is a predetermined size.

9. The method of claim 1, wherein selecting an origin section for the first trace further comprises:
   determining a random size of the origin section.

10. The method of claim 1, wherein the first trace comprises device metadata identifying the computing device and wherein anonymizing the first trace further comprises:
   removing, at the mapping server from the first trace, the device metadata.

11. The method of claim 10, wherein the device metadata is a device identifier of the computing device.

12. The method of claim 1, further comprising:
   receiving, at a mapping server from a client device, a plurality of traces, each trace comprising a set of location data, each set of location data comprising an origin point, a plurality of intermediate points, and a destination point in an ordered sequence;
   selecting, at the mapping server, an origin section for each trace of the plurality of traces, the origin section for a trace comprising the origin point and one or more intermediate points of that trace;
   removing, from each trace of the plurality of traces, the origin section;
   selecting, at the mapping server, a destination section for each trace of the plurality of traces, the destination section comprising the destination point and one or more intermediate points of that trace;
   removing, from each trace of the plurality of traces, the destination section; and
   dividing, at the mapping server, each trace of the plurality of traces into a second plurality of subtraces, each subtrace comprising a plurality of consecutive intermediate points of the location data.

13. The method of claim 1, further comprising:
   storing, by the mapping server, each subtrace of the plurality of subtraces and the second plurality of subtraces independently of each other subtrace in the set of subtraces; and
   aggregating the plurality of subtraces and the second plurality of subtraces into aggregated telemetry data.

14. The method of claim 1, wherein dividing the first trace into a plurality of subtraces comprises dividing the first trace into a plurality of subtraces based on measures of times or distances associated with the plurality of subtraces.

15. A non-transitory computer readable storage medium comprising instructions which, when executed by a processor, cause the processor to perform the steps of:
   receiving, at a mapping server from a client device, a first trace comprising a set of location data, the location data comprising an origin point, a plurality of intermediate points, and a destination point in an ordered sequence, wherein the first trace comprises identifying information associated with the client device; and
   anonymizing the first trace by:
      selecting, at the mapping server, an origin section for the first trace, the origin section comprising the origin point and one or more intermediate points;
      removing the origin section from the first trace;
      selecting, at the mapping server, a destination section for the first trace, the destination section comprising the destination point and one or more intermediate points;
      removing the destination section from the first trace; and
      dividing, at the mapping server, the first trace into a plurality of subtraces, each subtrace comprising a plurality of consecutive intermediate points of the location data.

16. The non-transitory computer readable storage medium of claim 15, wherein anonymizing the first trace further comprises:
   removing, from each subtrace, location data connecting the subtrace to any other subtraces of the set of subtraces; and
   storing, by the mapping server, each subtrace independently of each other subtrace in the set of subtraces.

17. The non-transitory computer readable storage medium of claim 15, wherein dividing the first trace into a set of subtraces comprises randomly selecting a size for each subtrace of the set of subtraces.

18. The non-transitory computer readable storage medium of claim 15, wherein anonymizing the first trace further comprises:
   determining one or more features of interest in the first trace, each feature of interest associated with one or more intermediate points of the first trace;
   and wherein dividing the first trace into a set of subtraces is based on the one or more features of interest.

19. The non-transitory computer readable storage medium of claim 15, wherein each subtrace of the set of subtraces is a predetermined size.

20. The non-transitory computer readable storage medium of claim 15, wherein dividing the first trace into a plurality of subtraces comprises dividing the first trace into a plurality of subtraces based on measures of times or distances associated with the plurality of subtraces.

* * * * *

UNITED STATES PATENT AND TRADEMARK OFFICE
CERTIFICATE OF CORRECTION

PATENT NO. : 10,664,616 B2  
APPLICATION NO. : 15/925755  
DATED : May 26, 2020  
INVENTOR(S) : Herlocker et al.

Page 1 of 1

It is certified that error appears in the above-identified patent and that said Letters Patent is hereby corrected as shown below:

In the Claims

Column 20, Claim 18, Line 36, after "trace;" insert -- and --.

Column 20, Claim 18, Line 37, delete "and" before "wherein".

Signed and Sealed this
Twenty-second Day of December, 2020

Andrei Iancu
*Director of the United States Patent and Trademark Office*